(12) United States Patent
Huybrechts et al.

(10) Patent No.: US 8,197,905 B2
(45) Date of Patent: Jun. 12, 2012

(54) METHOD OF APPLYING HIGH SOLIDS COATING COMPOSITION TO MULTILAYER COATING

(75) Inventors: Jozef Theresia Huybrechts, Turnhout (BE); Leen Tanghe, Eemegem (BE)

(73) Assignee: E I du Pont de Nemours and Company, Wilmington, DE (US)

( * ) Notice: Subject to any disclaimer, the term of this patent is extended or adjusted under 35 U.S.C. 154(b) by 1403 days.

(21) Appl. No.: 11/526,467

(22) Filed: Sep. 25, 2006

(65) Prior Publication Data

US 2007/0082992 A1 Apr. 12, 2007

Related U.S. Application Data

(60) Provisional application No. 60/723,863, filed on Oct. 5, 2005.

(51) Int. Cl.
*B05D 1/36* (2006.01)
*B05D 3/00* (2006.01)
*B05D 7/16* (2006.01)

(52) U.S. Cl. .................. 427/407.1; 427/385.5

(58) Field of Classification Search ............... 427/407.1, 427/409, 412.1, 412.3, 412.5, 372.2, 384, 427/385.5, 388.1, 388.2
See application file for complete search history.

(56) References Cited

U.S. PATENT DOCUMENTS 6,277,497 B1 8/2001 Aerts et al.

FOREIGN PATENT DOCUMENTS

| EP | 0 375 078 B1 | 5/1995 |
|---|---|---|
| EP | 1 027 383 B1 | 8/2000 |
| EP | 1 027 383 B1 | 2/2002 |
| EP | 1 411 72 A2 | 4/2004 |
| EP | 1 411 072 A2 | 4/2004 |
| WO | WO 99/21906 | 5/1999 |
| WO | WO 99/21906 A1 * | 5/1999 |

OTHER PUBLICATIONS

Vegter, G. C. et al.: "Ueber Den Effekt Der Einarbeitung Von Diolen in Alkydharze AUF Basis Verzweigter Carbonsaeuren", Fette, Seifen, Anstrichmittel, Industrieverlag Von Hernhaussen KG., Hamburg, DE., vol. 68, No. 4, Apr. 1966, pp. 283-288 (Abstract in English).
PCT International Search Report for International Application No. PCT/US2006/038836, dated Jan. 22, 2007.
Vegter et al., "Ueber Den Effekt Der Einarbeitung Von Diolen in Alkydharze AUF Basis Verzweigter Carbonsaeuren", Fette, Seifen, Anstrichmittel, Industrieverlag Von Hernhaussen KG, vol. 68, No. 4, Apr. 1966, pp. 283-288.
PCT International Search Report and Written Opinion for International Application No. PCT/US3006/038836 dated Jan. 22, 2007.

* cited by examiner

*Primary Examiner* — William Phillip Fletcher, III
(74) *Attorney, Agent, or Firm* — Sudhir G. Deshmukh

(57) ABSTRACT

The present invention is directed to a process of applying a solvent-based coating composition on a substrate to produce a multi-layer coating thereon. The binder component of the composition includes at least one hydroxy-functional polyether obtained from at least one polyol having at least three hydroxyl groups and at least one monoglycidyl ester of a branched monocarboxylic acid. The crosslinking component of the composition includes at least one cross-linking agent that is capable of entering into a cross-linking reaction with the hydroxyl groups of- the hydroxy-functional polyether. The process further includes curing the multi-layer coating. The process is well suited for producing clear coats and pigmented topcoats in automotive refinishing.

3 Claims, No Drawings

METHOD OF APPLYING HIGH SOLIDS COATING COMPOSITION TO MULTILAYER COATING

CROSS-REFENENCE TO RELATED APPLICATION

This application claims priority under 35 U.S.C. §119 from U.S. Provisional Application Ser. No. 60/723,863, filed Oct. 05, 2005.

FIELD OF THE INVENTION

The invention relates to coating compositions having a low content of volatile organic compounds based on hydroxy-functional polyethers and conventional crosslinkers.

DESCRIPTION OF RELATED ART

Due to enviromental friendly legislation, the coatings industry is under pressure to reduce volatile organic compounds (VOC) in coating formulations. Therefore, coating compositions are needed which have good overall drying properties and appearance, but which are inherently low in viscosity and require minimal dilution with solvents.

U.S. Pat. No. 6,277,497 describes branched hydroxy-functional polyester oligomers, which may be cured with conventional cross-linking agents. The polyester oligomers have tertiary ester end groups and are produced from polycarboxylic acids and tertiary glycidyl esters of carboxylic acids, preferably, pivalic acid glycidyl ester and/or from glycidyl-functional reaction products of polycarboxylic acids and epichlorohydrin and a tertiary acid, for example, pivalic acid. The polycarboxylic acids are obtained by reacting polyacids or anhydrides with polyols. Here a more balanced relationship between solids content and viscosity is required to be able to formulate coating compositions with low VOC content, e.g. with a VOC content of 2.1 lbs/gal and below.

EP 0 375 078 describes a process for preparing polyether oligomers by reacting aliphatic primary polyhydric alcohols with a glycidyl ester of a C9-C11 branched aliphatic acid. Coating compositions based on those polyether oligomers have a low VOC content of e.g. 2.1 lbs/gal, but need improvement for overall drying performance.

Furthermore WO 99/21906 describes coating compositions comprising 5-50 percent by weight of hydroxy-functional polyethers derived from at least one polyol having three or four hydroxyl groups and a monoglycidyl ester of a branched carboxylic acid, containing 5-13 carbon atoms, 40-60 percent by weight of a hydroxy-functional (meth) acrylic copolymer based on reaction products of monoglycidyl esters of a branched carboxylic acid, containing 5-13 carbon atoms and (meth)acrylic acid and 5-40 percent by weight of polyisocyanate cross-linkers. Those coating compositions do not have the required low content of volatile organic compounds of e.g. 2.1 lbs/gal or below.

Consequently, there was still a demand for solvent-based coating compositions, which on the one hand have a high solids content with sufficiently low viscosity, which are on the other hand show a satisfactory overall drying performance and satisfactory appearance.

SUMMARY OF THE INVENTION

The present invention provides coating compositions based on hydroxy-functional oligomeric polyethers which coating compositions overcome the above-stated disadvantages of the prior art. The present invention provides coating compositions having a low content of volatile organic compounds of e.g. 2.1 lbs/gal or below (e.g. in the range of 1.1 to 2.1 lbs/gal) as well as a balanced relationship between solids content and viscosity and a very good drying performance. The coatings obtained from those coating compositions show a very good appearance and dry in short drying times, even at lower temperatures of e.g. 60° C. and below, e.g. 20 to 60° C. High quality coatings can be achieved independent on the application conditions, i.e. independent of the relative humidity.

The invention relates to solvent-based coating composition comprising a binder component and a crosslinking component, wherein the binder component comprises A) at least one hydroxy-functional polyether having at least two secondary hydroxyl groups per molecule, a number average molecular weight Mn in the range of 200 to 5,000 and a polydispersity of <2, e.g. in the range of 1.05 to 1.9, wherein the polyether A) is obtained from Aa) at least one polyol having at least three hydroxyl groups and Ab) at least one monoglycidyl ester of a branched monocarboxylic acid, having 5 carbon atoms in the molecule, and wherein the crosslinking component comprises B) at least one cross-linking agent which is capable of entering into a cross-linking reaction with the hydroxyl groups of the hydroxy-functional polyether A).

DETAILED DESCRIPTION OF THE EMBODIMENTS

It will be appreciated that certain features of the invention which are, for clarity, described above and below in the context of separate embodiments may also be provided in combination in a single embodiment. Conversely, various features of the invention that are, for brevity, described in the context of a single embodiment may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about". Thus, slight variations above and below the stated ranges can be used to achieve substantially the same results as values within the ranges. Moreover, in the disclosure of these ranges, a continuous range is intended, covering every value between the minimum and maximum values, including the minimum and maximum end points of the range.

Unless stated otherwise, all molecular weights (both number and weight average molecular weight) referred to herein are determined by GPC (gel permeation chromatographie) using polystyrene as the standard. The present invention is directed to solvent-based coating compositions. Solvent-based coating compositions are coating compositions, wherein organic solvents are used as thinner when preparing and/or applying the coating composition.

Preferably the hydroxy-functional binder component of the coating composition according to the invention comprises A) at least one hydroxy-functional polyether having at least two secondary hydroxyl groups per molecule, a number average molecular weight Mn in the range of 400 to 4,000, particularly preferably in the range of 400 to 1500 and a polydispersity of <1.5, e.g. in the range of 1.05 to 1.4, particularly preferably of <1.3, e.g. in the range of 1.05 to 1.2, wherein the polyether A) is obtained from Aa) at least one polyol having at least 3 to 8 hydroxyl groups, most preferred 4 to 6 hydroxyl groups and Ab) at least one monoglycidyl ester of a branched monocarboxylic acid, having 5 carbon atoms in the molecule.

Preferably the binder component comprises 80 to 100 percent by weight of the at least one hydroxy-functional polyether A), particularly preferably comprises 90 to 100 percent by weight of the at least one hydroxy-functional polyether A).

The binder component may consist of 80 to 100 percent by weight of the at least one hydroxy-functional polyether A) and 0-20 percent by weight of at least one additional hydroxy-functional binder that is different from the hydroxy-functional polyether A), wherein the percent by weight of the hydroxy-functional polyether A) and the additional hydroxy-functional binder add up to 100 percent by weight.

The binder component comprises at least one hydroxy-functional polyether A). The hydroxy-functional polyether A) is obtained by reacting components Aa) and Ab).

Preferably the hydroxy-functional oligomeric polyether A) is obtained from

Aa) 10 to 80 percent by weight, more preferred 20-60 percent by weight of the at least one polyol having at least three hydroxyl groups, preferably 3 to 8, most preferred 4 to 6 hydroxyl groups with Ab) 20 to 90 percent by weight, more preferred 40 to 85 percent by weight of the at least one monoglycidyl ester of a branched monocarboxylic acid having 5 carbon atoms in the molecule, wherein the percent by weight of components Aa) and Ab) add up to 100 percent by weight.

The polyol Aa) to be reacted with the monoglycidyl ester of a branched monocarboxylic acid Ab) can be an aliphatic polyhydric alcohol having e.g. 3 to 16 carbon atoms in the molecule. The polyhydric alcohol may comprise solely primary hydroxyl groups or at least two primary hydroxyl groups in combination with one or more secondary hydroxyl groups.

Suitable compounds which can be used as polyol Aa) are any of the isomers corresponding to tri(hydroxymethyl) ethane, -propane, -butane, -pentane, -hexane, -heptane, -octane, and -nonane; tetra(hydroxymethyl )methane, -ethane, -propane, -butane, -pentane, -hexane, -heptane, and -octane; penta(hydroxymethyl)ethane, -propane, -butane, -pentane, -hexane, and -heptane; hexa(hydroxymethyl)ethane, -propane, -butane, -pentane, and -hexane and glycerine. The aliphatic alcohols may have one or more non-conjugated unsaturated links. They may also contain ether linkages.

Combinations of polyols Aa) can be used and blends of polyols with different functionality can be used as well, even in combination with di-functional polyols, so that the average functionality is at least 3, preferred at least 4.

Preferred polyols Aa) are glycerine, trimethylol propan, trimethylol ethane, di-trimethylol propan, mono-pentaerithrytol, di-pentaerithrytol, tri-pentaerithrytol, sorbitol or combinations thereof. In an especially preferred embodiment the polyol compound Aa) is mono-pentaerithrytol and/or di-pentaerithrytol.

The monoglycidyl ester of a branched monocarboxylic acid having 5 carbon atoms in the molecule (component Ab) is the monoglycidyl ester of pivalic acid.

The hydroxy-functional polyethers A) may be prepared by employing a ring opening reaction in which the n-functional polyol Aa) is reacted with 2n moles or less than 2n moles of the monoglycidylester Ab), wherein n is at least three, preferred 3 to 8. The n-functional polyol Aa) may be reacted with at least two, preferred with 3 to 12, most preferred with 4 to 9 moles of the monoglycidylester Ab). Polyols with 4 to 6 hydroxyl groups are most preferred. In the most preferred case of a 4 to 6-functional polyol it is preferred to react polyol Aa) with 3 to 12, preferred with 4 to 9 moles of the monoglycidylester Ab).

A further embodiment of the present invention, even if not preferred, is to use in addition to the monoglycidyl ester of a branched monocarboxylic acid having 5 carbon atoms (component Ab) small amouts of monoglycidyl esters of a branched monocarboxylic acid having more than 5 carbon atoms in the molecule, preferably having 9 to 11 carbon atoms in the molecule (component Ac). A preferred example of such a monoglycidyl ester ist the monoglycidyl ester of versatic acid. The hydroxy-functional oligomeric polyether A) may be obtained by reacting 10 to 80 percent by weight of component Aa), with 20-90 wt-percent of component Ab) and 0 to 15 percent by weight of component Ac), wherein the percent by weight of components Aa), Ab) and Ac) add up to 100 percent by weight.

It is preferred to prepare the oligomeric polyethers A) in the presence of an etherification catalyst. Suitable examples of etherification catalysts include metal salts like halides, and salts of alkanoic and naphthenic acids, particularly of those having in the range of from 2 to 30 carbon atoms per molecule. Very suitable catalysts are metal salts of Sn(II), Sn(IV), Zn, Fe, Zr, Ti, Pb, Bi, tin or zinc alkanoates, dibutyltin(IV) dialkanoates, and iron salts of naphthenic acids. A preferred catalyst is tin(II)octoate.

The catalyst tin(II)octoate may be employed preferably in amounts of 0.01 to 0.5 percent by weight, preferably of 0.1 to 0.2.percent by weight, based on solids binder. The catalyst may be added without heating the reaction mixture or heating to a temperature in the range of from 60 to 240° C. The reaction may very suitably be carried out at a temperature in the range of from 60 to 240° C., preferably from 120 to 200° C.

Polyethers A) prepared according to the invention by the reaction procedures described above have a narrow molecular weight distribution. They have in general a polydispersity (calculated as Mw/Mn) of <2, preferably of <1.5, most preferred of <1.3. Such polyethers are sometimes referred to as "star" oligomers because they have a plurality of arms or branches and have an exact functionality.

The binder component A) may contain in addition to the hydroxy-functional polyethers A) at least one hydroxy-functional binder that is different from the hydroxy-functional polyether A). The binder component can comprise 80 to 99.5 percent by weight, preferably 90 to 99.5 percent by weight, of the at least one hydroxy-functional polyether A) and 0.5 to 20 percent by weight, preferably 0.5 to 10 percent by weight of at least one additional hydroxy-functional binder that is different from the hydroxy-functional polyether A), wherein the percent by weight of the hydroxy-functional polyether A) and the additional hydroxy-functional binder add up to 100 percent by weight.

The additional hydroxy-functional binder may comprise conventional hydroxy-functional resins such as are, for example, used in the production of single- or two-component cross-linkable, solvent-based coating compositions, in particular, in vehicle coating, and are sufficiently familiar to the person skilled in the art.

Examples for additional hydroxy-functional binders are hydroxy-functional alkyd, polyurethane, poly(meth)acrylic and/or polyester resins. The additional hydroxy-functional binders may also be present in the modified form, e.g., in the form of (meth)acrylated polyesters or (meth)acrylated polyurethanes or in form of seed polymers. They may be used on their own or in a mixture. These resins generally have a hydroxyl value of 20 to 250 mg of KOH/g. If additional hydroxyl-functional binders are present in addition to the hydroxy-functional polyethers A) hydroxy-functional polyester polyols are preferably used. Examples of preferred hydroxy-functional polyesters are those branched polyester oligomers described in U.S. Pat. No. 6,277,497.

The coating compositions may also contain low molecular weight reactive components, so-called reactive diluents that are capable of reacting with the cross-linking agent. Examples of these include hydroxy- or amino-functional reactive diluents.

The coating compositions according to the invention comprise at least one crosslinking agent B) for the hydroxyfunctional binder component A). Crosslinking agents are for example polyisocyanates with free and/or blocked isocyanate groups and melamine resins. Especially preferred polyisocyanate crosslinking agents having free isocyanate groups are used as crosslinking agent B).

The polyisocyanates comprise, for example, any desired organic polyisocyanates having aliphatically, cycloaliphatically, araliphatically and/or aromatically attached free isocyanate groups. The polyisocyanates preferably comprise polyisocyanates or polyisocyanate mixtures having exclusively aliphatically and/or cycloaliphatically attached isocyanate groups with an average NCO functionality of 1.5 to 5, preferably of 2 to 4.

Particularly suitable compounds are, for example, so-called "coating polyisocyanates" based on hexamethylene diisocyanate (HDI), 1-isocyanato-3,5,5-trimethyl-5-isocyanatomethylcyclohexane (IPDI) and/or bis(isocyanatocyclohexyl)methane and the per se known derivatives of said diisocyanates comprising biuret, allophanate, urethane and/or isocyanurate groups. Triisocyanates, such as, triisocyanatononane may also be used.

Sterically hindered polyisocyanates are likewise also suitable. Examples of these are 1,1,6,6-tetramethylhexamethylene diisocyanate, 1,5-dibutylpentamethyl diisocyanate, p- or m-tetramethylxylylene diisocyanate and the corresponding hydrogenated homologues.

Diisocyanates may in principle be reacted in conventional manner to yield more highly functional compounds, for example by trimerization or by reaction with water or polyols, such as for example trimethylolpropane or glycerol.

Corresponding prepolymers containing isocyanate groups may also be used as di- and/or polyisocyanates. The polyisocyanate cross-linking agents may be used individually or in combination.

The coating compositions according to the invention may contain pigments and/or fillers. Suitable pigments are all the conventional color-imparting and/or special effect-imparting coating pigments of an organic or inorganic nature.

The coating compositions may contain conventional coating additives. The additives are the conventional additives, which may be used, in the coating sector. Examples of such additives include light protecting agents, e.g., based on benzotriazoles and HALS compounds (hindered amine light stabilizers), leveling agents based on (meth)acrylic homopolymers or silicone oils, rheology-influencing agents, such as, fine-particle silica or polymeric urea compounds, thickeners, such as, partially cross-linked polycarboxylic acid or polyurethanes, anti-foaming agents, wetting agents, curing catalysts for the cross-linking reaction, for example, organic metal salts, such as, dibutyltin dilaurate, zinc naphthenate and compounds containing tertiary amino groups such as triethylamine for the hyd roxyl/isocyanate reaction.

Organic solvents may also be present in the coating composition according to the invention. Organic solvents comprise conventional coating solvents. These may originate from the production of the binders and/or are added separately. Examples of such solvents are mono- or polyhydric alcohols, for example, propanol, butanol, hexanol; glycol ethers or esters, for example, butyl glycol, butyl diglycol, diethylene glycol dialkyl ethers, dipropylene glycol dialkyl ethers, ethyl glycol acetate, butyl glycol acetate, butyl diglycol acetate, esters, such as, butyl acetate, isobutyl acetate, amyl acetate, glycols, for example, ethylene glycol, propylene glycol and oligomers thereof, N-ethyl-2-pyrrolidone, and ketones, for example, methyl ethyl ketone, acetone, cyclohexanone; aromatic or aliphatic hydrocarbons, for example, toluene, xylene, or linear or branched aliphatic C6-C12 hydrocarbons.

Depending upon the type of cross-linking agent, single-component or two-component coating compositions may be formulated according to the invention. If polyisocyanates having free isocyanate groups are used as the cross-linking agent, the coating compositions are two-component systems, i.e., the binder components containing hydroxyl groups, optionally, together with pigments, extenders and conventional coating additives, and the polyisocyanate component may be mixed together only shortly before application. The coating compositions may, in principle, additionally be adjusted to spraying viscosity with organic solvents before being applied.

The coating compositions according to the invention may be applied by known methods, particularly by spraying. The coatings obtained may be cured at room temperature or by forced drying at higher temperatures, e.g., up to 80° C., preferably, at 20° C. to 60° C. They may also, however, be cured at higher temperature from, for example, 80° C. to 160° C.

The coating compositions according to the invention are suitable for automotive and industrial coating. In the automotive coating sector the coating agents may be used both for OEM (Original Equipment Manufacture) automotive coating and for automotive and automotive part refinishing. Stoving or baking temperatures from 80° C. to 140° C., for example, preferably from 110° C. to 130° C., are used for original automotive coating. Curing temperatures from 200° C. to 80° C., for example, particularly from 40° C. to 60° C. are used for automotive refinishing. The coating compositions can also be used for coating large vehicles and transportation vehicles, such as, trucks, busses and railroad cars, where typically curing temperatures of up to 80° C. or higher than 80° C. are used. Furthermore, the coating compositions can be used for coating any industrial goods other than motor vehicles.

The coating compositions according to the invention may be formulated as pigmented top coats or as transparent clear coats and used for the preparation of the outer pigmented top coat layer of a multi-layer coating or for the preparation of the outer clear coat layer of a multi-layer coating. The present invention also relates, therefore, to the use of the coating compositions according to the invention as a pigmented top coat coating composition (monocoat) and as a clear coat coating composition, and to a process for the preparation of multi-layer coatings, wherein in particular the pigmented top coat and transparent clear coat layers of multi-layer coatings are produced by means of the coating compositions according to the invention.

The coating compositions may be applied as a pigmented topcoat layer, for example, to conventional 1-component or 2-component primer surfacer layers. The coating compositions may be applied as transparent clear coat coating compositions, for example, by the wet-in wet method, to solvent-based or aqueous color- and/or special effect-imparting base coat layers. In this case, the color- and/or special effect-imparting base coat layer is applied to an optionally pre-coated substrate, particularly pre-coated vehicle bodies or parts thereof, before the clear coat coating layer of the clear coat coating compositions according to the invention is applied. After an optional flash-off phase, both layers are then cured together. Within the context of OEM automotive coating, flash-off may be carried out, for example, at 20° C. to 80° C. and within the context of refinishing over a period of 15 to 45 minutes at ambient temperature, depending on the relative humidity.

The coating compositions of the present invention may be used in particular advantageously as clear coat and pigmented topcoat coating compositions in automotive refinishing.

The coating compositions of the present invention have a low content of volatile organic compounds of 2.1 lbs/gal and below and show a satisfactory potlife, a very good drying performance as well as a very good hardness development. The coatings have an excellent appearance.

The invention will be explained in more detail on the basis of the examples below. All parts and percentages are on a weight basis unless otherwise indicated.

EXAMPLES

Example 1

Preparation of Polyether 1

The following constituents were charged to a reaction vessel equipped with a stirrer, a thermometer and a condensor: 250 grams of di-trimethylol propane (DTMP), 640 grams of glycidyl pivalate (GPV), 96.22 grams of n-butylacetate (BAC) and 1.78 grams of Tin 2 Octaote (Sn2-Tegocat 129 from Goldschmidt). The mixture was heated to its reflux temperature of about 180° C. for about 4 hours till the glycidyl pivalate was converted. After cooling down the polyether had the following test results:
Solids: 90.1 percent
Viscosity: Z1+1/2 (Measured according Gardner-Holdt)
Acid value: 0.5 mg KOH/g
Mn: 980
Mw: 1150
Polydispersity (Mw/Mn): 1.2

Example 2

Preparation of Polyether 2

The following constituents were charged to a reaction vessel equipped with a stirrer, a thermometer and a condensor: 134 grams of trimethylol propane (TMP), 480 grams of glycidyl pivalate (GPV), 66.77 grams of n-butylacetate (BAC) and 1.23 grams of Tin 2 Octaote (Sn2-Tegocat 129 from Goldschmidt). The mixture was heated to its reflux temperature of about 180° C. for about 4 hours till the glycidyl pivalate was converted. After cooling down the polyether had the following test results:
Solids: 89.8 percent
Viscosity: W (Measured according Gardner-Holdt)
Acid value: 0.4 mg KOH/g
Mn: 800
Mw: 890
Polydispersity (Mw/Mn): 1.1

Example 3

Preparation of Polyether 3

The following constituents were charged to a reaction vessel equipped with a stirrer, a thermometer and a condensor: 136 grams of mono pentaerithrytol (MPE), 480 grams of glycidyl pivalate (GPV), 66.77 grams of n-butylacetate (BAC) and 1.23 grams of Tin 2 Octaote (Sn2-Tegocat 129 from Goldschmidt). The mixture was heated to its reflux temperature of about 180° C. for about 4 hours till the glycidyl pivalate was converted. After cooling down the polyether had the following test results:
Solids: 89.2 percent
Viscosity: Z1 (Measured according Gardner-Holdt)
Acid value: 0.4
Mn: 800
Mw: 880
Polydispersity (Mw/Mn): 1.1

Example 4

Preparation of Polyether 4

The following constituents were charged to a reaction vessel equipped with a stirrer, a thermometer and a condensor: 136 grams of mono-pentaertythritol (MPE), 640 grams of glycidyl pivalate (GPV), 84.45 grams of n-butylacetate (BAC) and 1.55 grams of Tin 2 Octaote (Sn2-Tegocat 129 from Goldschmidt). The mixture was heated to its reflux temperature of about 180° C. for about 4 hours till the glycidyl pivalate was converted. After cooling down the polyether had the following test results:
Solids: 91.1 percent
Viscosity: Z1 (Measured according Gardner-Holdt)
Acid value: 0.4 mg Koh/g
Mn: 900
Mw: 1000
Polydispersity (Mw/Mn): 1.1

Example 5

Preparation of Polyether 5

The following constituents were charged to a reaction vessel equipped with a stirrer, a thermometer and a condenser: 254 grams of di-pentaertythritol (DPE), 960 grams of glycidyl pivalate (GPV), 132.57 grams of n-butylacetate (BAC) and 2.43 grams of Tin 2 Octoate (Sn2-Tegocat 129 from Goldschmidt). The mixture was heated to its reflux temperature of about 180° C. for about 4 hours till the glycidyl pivalate was converted. After cooling down the polyether had the following test results:
Solids: 90.7 percent
Viscosity: Z5-1/4 (Measured according Gardner-Holdt)
Acid value: 0.4 mg KOH/g
Mn: 1220
Mw: 1440
Polydispersity (Mw/Mn): 1.2

Comparative Example 1

Preparation of Oligomer According to EP 0375078

The following constituents were charged to a reaction vessel equipped with a stirrer, a thermometer and a condenser: 134 grams of Trimethylol propane (TMP), 750 grams of the glycidyl ester of C10 versatic acid (Cardura E10P from Resolution), 96.23 grams of n-butylacetate (BAC) and 1.77 grams of Tin 2 Octoate (Sn2-Tegocat 129 from Goldschmidt). The mixture was heated to its reflux temperature of about 180° C.

for about 4 hours till the Cardura E10 was converted. After cooling down the polyether had the following test results:
Solids: 91.2 percent
Viscosity: V+1/2 (Measured according Gardner-Holdt)
Acid value: 0.4 mg KOH/g
Mn: 930
Mw: 1010
Polydispersity (Mw/Mn): 1.1

Comparative Example 2

Preparation of Oligomer According to EP 0375078
The following constituents were charged to a reaction vessel equipped with a stirrer, a thermometer and a condensor: 134 grams of di-Trimethylol propane (DTMP), 1000 grams of the glycidyl ester of C10 versatic acid (Cardura E10P from Resolution), 135.5 grams of n-butylacetate (BAC) and 2.5 grams of Tin 2 Octaote (Sn2-Tegocat 129 from Goldschmidt). The mixture was heated to its reflux temperature of about 180° C. for about 4 hours till the Cardura E10 was converted. After cooling down the polyether had the following test results:
Solids: 92 percent
Viscosity: Y+1/4 (Measured according Gardner-Holdt)
Acid value: 0.3 mg KOH/g
Mn: 1150
Mw: 1300
Polydispersity (Mw/Mn): 1.1

Comparative Example 3

Preparation of Oligomer according to U.S. Pat. No. 6,277,497
According to Example 8 of U.S. Pat. No. 6,277,497 a oligoester was prepared as follows:
136 grams of MPE were refluxed with 504 grams of methyl hexahydrophtalic anhydride for about one hour in 175 grams of butyl acetate (BuAc). Then 480 grams of glycidyl pivalate were added followed by such an amount of BuAc that a theoretical overall solids of 80 percent in BuAc was achieved. The mixture was refluxed until the acid value was below 1.
The polyester oligomer had a solids content of 78.2 percent at Gardner-Holdt viscosity of Z2+1/2, an acid value of 0.7 mg KOH/g and a molecular weigth distribution of Mn/Mw=1180/1980.

Comparative Example 4

Preparation of Comparative Polyether 4
The following constituents were charged to a reaction vessel equipped with a stirrer, a thermometer and a condensor: 254 grams of di pentaerythritol (diPE), 800 grams of glycidyl pivalate (GPV), 250 grams of the glycidyl ester of C10 versatic acid (Cardura E10P from Resolution), 137.77 grams of methyl isobutylketone (MiBK), 3.62 grams 9,10-dihydro-9-oxa-10-phosphaphenantrene-10-oxide (Sanko HCA from Ecem), and 2.61 grams of Tin 2 Octaote (Sn2-Tegocat 129 from Goldschmidt). The mixture was heated to its reflux temperature of about 180° C. for about 4 hours till the glycidyl pivalate and Cardura E10 were converted. After cooling down the polyether had the following test results:
Solids: 90.48 percent
Viscosity: Z5−1/4 (Measured according Gardner-Holdt)
Acid value: 0.36 mg KOH/g
Mn: 1300
Mw: 1500
Polydispersity (Mw/Mn): 1.15

Comparative Example 5

Preparation of Comparative Polyether 5
The following constituents were charged to a reaction vessel equipped with a stirrer, a thermometer and a condensor: 136 grams of mono pentaerythritol (MPE), 1000 grams of the glycidyl ester of C10 versatic acid (Cardura E10P from Resolution), 123.72 grams of n-butylacetate (BAC) and 2.28 grams of Tin 2 Octaote (Sn2-Tegocat 129 from Goldschmidt). The mixture was heated to its reflux temperature of about 180° C. for about 4 hours till the Cardura E10 was converted. After cooling down the polyether had the following test results:
Solids: 91.83 percent
Viscosity: X+1/2 (Measured according Gardner-Holdt)
Acid value: 0.52 mg KOH/g
Mn: 1120
Mw: 1230
Polydispersity (Mw/Mn): 1.1
Preparation of Clear Coats
The following ingredients (Table 1) were mixed together to form clear coat compositions according to the invention as well as comparative clear coats.
Part 2 (polyisocyanate hardener) was added to part 1 with mixing. All experimental formulations had a NCO/OH equivalent ratio of 1.15 and a 80/20 mixture of HDI/IPDI (HDI=hexamethylene diisocyanate, IPDI=isophorone diisocyanate). The commercial control was a 3.5 VOC clearcoat (clearcoat 3800S, commercially available from DuPont), which was activated in ratio by volume of 3:1 with the HS activator XK205 (from DuPont). HS activator XK205 is a 70 percent solid activator containing HDI-trimer Desmodur N3390 (Bayer).
The clearcoats were sprayed on panels precoated with an electrodeposition coat and a solvent-based basecoat (Centari 6000 dark blue metallic basecoat from DuPont). There was a 30 minutes flash off of the basecoat at room temperature before applying the clear coats. The clearcoats were applied via 1 cross coat with a Devilbiss HVLP spraygun, with gravity feed. After application of the clearcoats, there was a 5 minutes flash off time and the panels were baked during 30 minutes at 60° C.

TABLE 1

Clearcoat compositions

| | Polyether 1 | Polyether 2 | Polyether 4 | Polyether 5 |
|---|---|---|---|---|
| Part 1 | | | | |
| polyether | 40.66 | 37.63 | 37.47 | 37.55 |
| 1% DBTDL in BuAc | 2.01 | 1.74 | 0.72 | 0.72 |
| 20% DABCO in propylene glycol methyl ether | — | — | 1.09 | 1.07 |
| Byk 358 | 0.18 | 0.18 | 0.18 | 0.20 |
| Byk 310 | 0.18 | 0.18 | 0.18 | 0.20 |
| MAK | 5.53 | 9.12 | 7.97 | 7.82 |
| acetic acid | 0.43 | 0.43 | 1.3 | 1.28 |
| Tinuvin 292 | 0.34 | 0.36 | 0.36 | 0.38 |
| Tinuvin 1130 | 0.68 | 0.36 | 0.72 | 0.79 |
| Part 2 | | | | |
| Desmodur XP2410 | 28.07 | 30.79 | 29.74 | 28.68 |
| Vestanat T1890L | 10.03 | 11.01 | 10.62 | 10.25 |
| MAK | 11.91 | 8.2 | 9.64 | 11.07 |

TABLE 2

| Test results | | | | |
|---|---|---|---|---|
| solids (percent) | 72.86 | 73.05 | 72.34 | 71.45 |
| potlife | 65 min. | 60 min. | 60 min. | 60 min. |
| practical VOC (lbs/gal) | 2.1 | 2.1 | 2.1 | 2.1 |
| thickness microns* | 55 | 55 | 50 | 50 |
| dust free time | 4' | 4' | imm. | imm. |
| tack free time | >7 hrs | >24 hrs | 2 hrs | 2 hrs |
| gloss 20° | 81 | 81 | 82 | 82 |
| DOI | 97 | 97 | 96 | 95 |
| flop | 10.8 | 10.37 | 10.09 | 11 |
| Fisher hardness after 4 hours | 0.17 | — | 2.5 | 1.9 |
| Fisher hardness after 1 day | 5.7 | 11.5 | 10.6 | 10.8 |
| Fisher hardness after 1 week | 11.9 | 11.5 | 10.7 | 12 |
| Persoz hardness after 4 hours | 52 | 40 | 210 | 190 |
| Persoz hardness after 1 day | 200 | 182 | 280 | 290 |
| Persoz hardness after 1 week | 310 | 284 | 330 | 335 |

| | Comparative Polyether 5 | CC 3800S |
|---|---|---|
| Part 1 | | |
| oligomer | | 44.89 |
| 1% DBTDL in BuAc | | 0.9 |
| 20% DABCO in propylene glycol methyl ether | | 1.44 |
| Byk 358 | | 0.18 |
| Byk 310 | | 0.18 |
| MAK | | 1.11 |
| acetic acid | | 0.58 |
| Tinuvin 292 | | 0.36 |
| Tinuvin 1130 | | 0.36 |
| Part 2 | | |
| Desmodur XP2410 | | 24.75 |
| Vestanat T1890L | | 8.84 |
| MAK | | 16.41 |

TABLE 2

| Test results | | |
|---|---|---|
| solids (percent) | 73.12 | 53.6 |
| potlife | 60 min. | 75' |
| practical VOC (lbs/gal) | 2.19 | 3.5 |
| thickness microns* | 50 | 50 |
| dust free time | 2 h 30 | imm. |
| tack free time | >24 hrs | 3' |
| gloss 20° | 81 | 89 |
| DOI | 96 | 91 |
| flop | 11.29 | 11.4 |
| Fisher hardness after 4 hours | — | 0.8 |
| Fisher hardness after 1 day | — | 5.8 |
| Fisher hardness after 1 week | — | 13.8 |
| Persoz hardness after 4 hours | 26 | 100 |
| Persoz hardness after 1 day | 63 | 200 |
| Persoz hardness after 1 week | — | 320 |

| | Comparative Polyether 1 | Comparative Polyether 2 | Comparative Polyether 3 | Comparative Polyether 4 |
|---|---|---|---|---|
| Part 1 | | | | |
| oligomer | 47.41 | 46.48 | 40.92 | 40.88 |
| 1% DBTDL in BuAc | 2.5 | 2.4 | 1.26 | 0.91 |
| 20% DABCO in propylene glycol methyl ether | — | — | — | 1.46 |
| Byk 358 | 0.18 | 0.16 | 0.18 | 0.18 |
| Byk 310 | 0.18 | 0.16 | 0.18 | 0.18 |
| MAK | 14.73 | — | 6.07 | 4.7 |
| acetic acid | 0.44 | 0.44 | 0.42 | 0.58 |
| Tinuvin 292 | 0.34 | 0.3 | 0.32 | 0.37 |
| Tinuvin 1130 | 0.71 | 0.6 | 0.64 | 0.74 |
| Part 2 | | | | |
| Desmodur XP2410 | 24.68 | 23.35 | 26.55 | 34.24 |
| Vestanat T1890L | 8.81 | 8.35 | 9.49 | — |
| MAK | — | 17.76 | 13.97 | 15.76 |

TABLE 2

| Test results | | | | |
|---|---|---|---|---|
| solids (percent) | 73.7 | 73 | 74.1 | 72.78 |
| potlife | 60 min. | 55 min. | 50 min. | 60 min. |
| practical VOC (lbs/gal) | 2.1 | 2.1 | 2.1 | 2.17 |
| thickness microns* | 50 | 50 | 50 | 60 |
| dust free time | 2 h 20 | 1 h 40 | >24 hrs | imm. |
| tack free time | >>24 hrs | >>24 hrs | >>24 hrs | 5 h 30 |
| gloss 20° | 80 | 80 | — | 82 |
| DOI | 97 | 92 | — | 93 |
| flop | 11.5 | 11.7 | — | 10.2 |
| Fisher hardness after 4 hours | — | — | — | 3.76 |
| Fisher hardness after 1 day | — | 0.8 | — | 9.64 |
| Fisher hardness after 1 week | 0.8 | 1.6 | — | 12.47 |
| Persoz hardness after 4 hours | 21 | 26 | — | 180 |
| Persoz hardness after 1 day | 42 | 60 | — | 167 |
| Persoz hardness after 1 week | 70 | 100 | — | 302 |

The clearcoats according to the invention (clearcoats with polyether 1 to 5) as well as the comparative clear coats (clearcoats with comparative polyether 1 to 5) had a low VOC of about 2.1 lbs/gal. But it could be shown that the clearcoats according to the invention have an outstanding better drying performance and hardness development than the comparative clear coats as indicated by the dust free time and the tack free time and the Fisher and Persoz hardness.

* dry film thickness

Byk 358: acrylic levelling additive from Byk Chemie.

Byk 310: silicone surface additive from Byk Chemie.

Tinuvin 292: UV stabilizer from Ciba Speciality Chemicals.

Tinuvin 1130: UV absorber from Ciba Speciality Chemicals.

DBTDL: dibutyl tindilaurate from AKCROS Chemicals (Tinstab BL277).

DABCO: 1,4-diazobicyclo[2.2.2]octane from Air Products.

Desmodur XP2410: asymmetric HDI-trimer (100 percent solids) from Bayer.

Vestanat T1890L: 70 percent solid IPDI in butylacetate/ Solveso 100 (1/2) from Degussa.
CC=clear coat
MAK=methyl amyl ketone
Testing Methods:
  potlife: the potlife of the compositions was measured by measuring the viscosity increase as a function of time. Potlife=initial viscosity×1.5. The potlife defined the period during which the clearcoat is still easy to spray.
  practical VOC is measured via UK method (0.5 gram, 1 h×110° C., dish 55 mm)
  dry film thickness: used equipment is from "Braive Instruments" (Belgium). Accurancy: 0.0001 mm
  Dust free time: the point in the drying process when a plush of cotton fibers can be rubbed over or nudged on the film without leaving one of the fibers on the paints.
  Tack free time was measured according to ASTM D1640, p. 273. A film is considered to have dried "tack-free" when the tack tester tips over immediately on removing a 300 g weight allowed to act for 5 sec on the counter-weighted metal square base fitted with masking tape and aluminum foil.
  Gloss is measured using a glossmeter and recording the specular reflection at a particular angle (in this case, 20°). The reflectometer used was REF03, Dr. Lange, Germany.
  Distinctness of Image (DOI) was measured with a Wavescan-DOI apparatus from BYK Gardner, Germany. The DOI of a clearcoat can also be described in terms such as brilliance, sharpness or clarity. The more distinct the reflection of an object on the surface, the more brilliant the coating film will appear.
  Flop: Strike-in is the interaction between the basecoat and clearcoat, during wet-on-wet application. The degree of interaction is dependent upon the formulation, process parameters and/or ambient conditions. When this interaction is excessive, strike-in, or redissolving, will occur. This will result in a mottled appearance of the basecoat and a "fuzzy" appearance of the clearcoat. The degree of strike-in can be expressed by measuring the "flop index" or "flop" of a panel. The lower the flop measurement, the greater the strike-in. The flop of the samples below was measured on the same day as the basecoat-clearcoat application with a Chromavision MA100, available from DuPont, Wilmington, Del. The measurements were compared to those of a standard reference panel sprayed with 3800S, which was sprayed under the same spray and bake conditions.
  Fisher hardness is measured using the Fischerscope® hardness tester (the measurement is in Newtons per square millimeter). The equipment uses a micron indention method where a knoop indentor of known geometry is loaded on the sample surface.
  The change in film hardness of the coating was measured with respect to time by using a Persoz hardness tester supplied by Braive Instruments (Belgium). The number of oscillations (referred to as Persoz number) were recorded.

The invention claimed is:

1. A process which comprises applying a solvent-based coating composition having a low content of volatile organic compounds of 2.1 lbs/gal and below on a substrate to obtain a clear coating layer of a multi-layer coating thereon, said solvent-based coating composition comprising a binder component and a crosslinking component, wherein the binder component comprises
  A) at least one hydroxy-functional polyether having at least two secondary hydroxyl groups per molecule, a number average molecular weight Mn in the range of 200 to 5,000 and a polydispersity of <2, wherein the polyether A) is obtained from
  Aa) at least one polyol having at least three hydroxyl groups and
  Ab) at least one monoglycidyl ester of a branched monocarboxylic acid, having 5 carbon atoms in the molecule, and wherein the crosslinking component comprises
  B) at least one cross-linking agent which is capable of entering into a cross-linking reaction with the hydroxyl groups of the hydroxy-functional polyether A), wherein the binder component consists of 80 to 100 percent by weight of the at least one hydroxy-functional polyether A) and 0 to 20 percent by weight of at least one additional hydroxyl-functional binder that is different from the hydroxyl-functional polyether A), and curing said multi-layer coating.

2. The process of claim 1, wherein said multi-layer coating comprises a top coat layer and said clear coating layer, wherein the top coat layer is composed of a color-and/or special effect-imparting base coat coating compound.

3. The process according to claim 1, wherein the substrate is selected from the group consisting of automotive bodies and automotive body parts.

* * * * *